United States Patent [19]

Chang

[11] Patent Number: 5,022,896
[45] Date of Patent: Jun. 11, 1991

[54] METHOD OR PURIFYING POLLUTANT GASES AND APPARATUS THEREOF

[75] Inventor: Ha Y. Chang, Seoul, Rep. of Korea

[73] Assignee: Hyundae Environment Energy Management Corp. Ltd., Seoul, Rep. of Korea

[21] Appl. No.: 431,331

[22] Filed: Nov. 3, 1989

[30] Foreign Application Priority Data

Nov. 9, 1988 [KR] Rep. of Korea ............... 14678/1988

[51] Int. Cl.⁵ ............................................. B01D 47/00
[52] U.S. Cl. ........................................... 55/85; 55/86; 55/92; 261/124
[58] Field of Search ................. 55/85, 86, 92, 94, 223, 55/235, 237; 261/124

[56] References Cited

U.S. PATENT DOCUMENTS 3,990,870 11/1976 Miczek ..................................... 55/92
4,371,382 2/1983 Ross ........................................ 55/92
4,734,109 3/1988 Cox ......................................... 55/92

Primary Examiner—Jay H. Woo
Assistant Examiner—C. Scott Bushey
Attorney, Agent, or Firm—Schmeiser, Morelle & Watts

[57] ABSTRACT

Method of purifying the pollutant gas in which a vortex is formed by spurting the purifying solution into the cylindrical tank and the pollutant gas is blast off in the same direction as the vortex so that the purified gas rising upward through the purifying solution to be discharged, and the pollutant gas purifying apparatus including the annular gas fee tube with the cylindrical water tank longitudinally installed along the inner circumferential surface of the annular gas feed tube and connecting tubes while water tubes are longitudinally installed inside the cylindrical tank and nozzles are vertically arranged in one direction, with water tubes connected to the pump.

5 Claims, 5 Drawing Sheets

METHOD OR PURIFYING POLLUTANT GASES AND APPARATUS THEREOF

BACKGROUND OF THE INVENTION

This invention relates to the method of purifying pollutant gases and the apparatus thereof for the purification of such harmful gases as $SO_2$, $H_2SO_4$, $HCl$ and $NH_4Cl$ which are inevitably generated for the most part in such places as plating plants, welding sites, chemical plants and pharmaceutical plants.

Also in the past, gas nozzle tubes were installed in the lower part of a large tank, while plural wire nettings were placed in its upper part, in order to purify pollutant gases. On the wire nettings were deposited small-sized granular bodies in a fixed thickness, with water nozzle tubes installed over the beds, so that the surfaces of granular bodies might be wetted by water. The gas from the gas nozzle tube rises and emerges through the granular bodies deposited in multipler. It is a packed tower type purifying apparatus designed to allow only the purified gas to rise by bringing it into contact with the spurted water wetting the surfaces for reaction. However, the contact is only a short period of time in which the gas moves upward by the spurting pressure and buoyancy at a relatively small one-to-one contact volume ratio with water, resulting in a low purifying efficiency and also constituting a decisively defective factor in the practical use. Its structure is complicated and entails a problem of the said facility becoming enormous.

Also, as another type of the apparatus, there is an agitation type purifying apparatus. Gas nozzle tubes are installed in the lower part of the tank which is filled with water while a motor-driven propeller is fitted above them so that the bubbles generated by the gas nozzle tubes are broken up by the propeller and react in contact with water. This way only the purified gas rises and then it is vented. However, since there is a limit to improving the gyration power of water even though the rotation speed of the propeller is increased, it is difficult to increase their rising velocity of the bubbles. As a result, the contact time with water becomes short and the harmful gas fails to sufficiently react with water. In this connection, it poses the problem of a lowered purifying efficiency, necessitating the use of a large propeller of the almost the same diameter as the tank. Its driving causes vibration and noise while increasing electric power charges. Moreover, the bubbles in the central part of the propeller and outside the both ends do not receive any particular gyration power and rises upward to cause the further lowering of the purifying efficiency.

OBJECTS AND SUMMARY OF THE INVENTION

The present invention is designed to solve the problems involved in the conventional method of purification as reviewed above. It enables the pollutant gas to enter without resistance the purifying solution whirling at a high speed. Since the gyration power of the purifying solution is stronger than the buoyancy of the pollutant gas bubbles, the bubbles gradually become thinly elongated and disappear ultimately. The pollutants in the gas dissolve by the reaction with water. Relating to the method of purification and its apparatus that allows only such components as $CO_2$, $N_2$ and $O_2$ to be vented, the detailed description thereof according to the drawings attached is as follows:

DESCRIPTION OF THE INVENTION

Figure 1A:
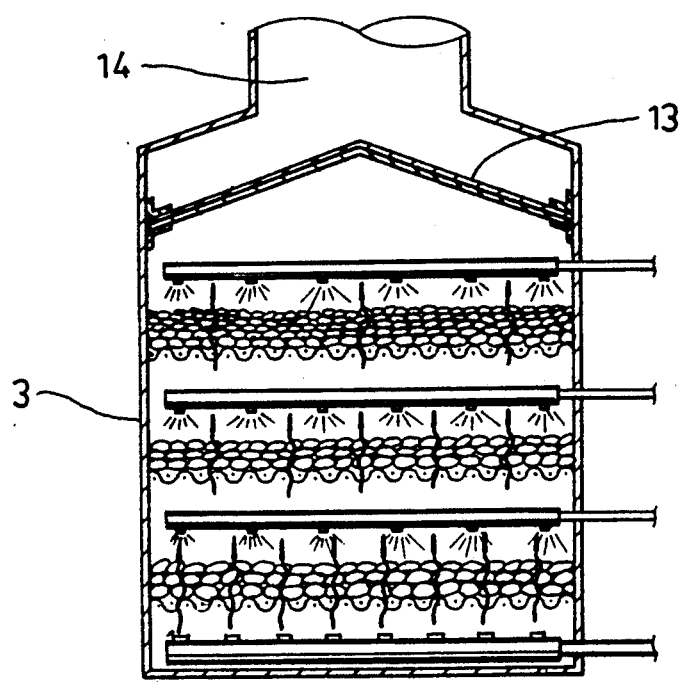
FIG. 1(a) and 1(b) are diagrams illustrating the conventional method of purifying pollutant gases.
Figure 1B:
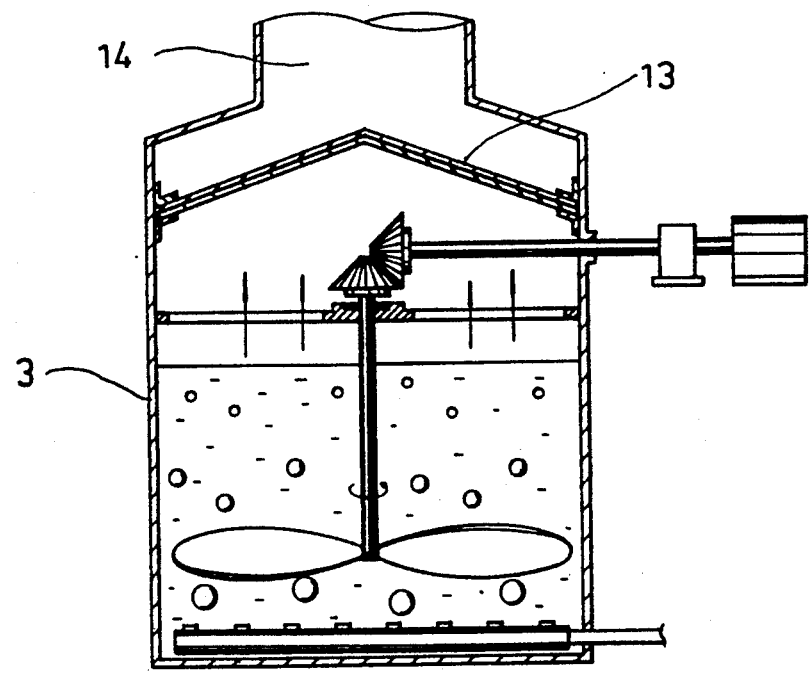
Figure 2:
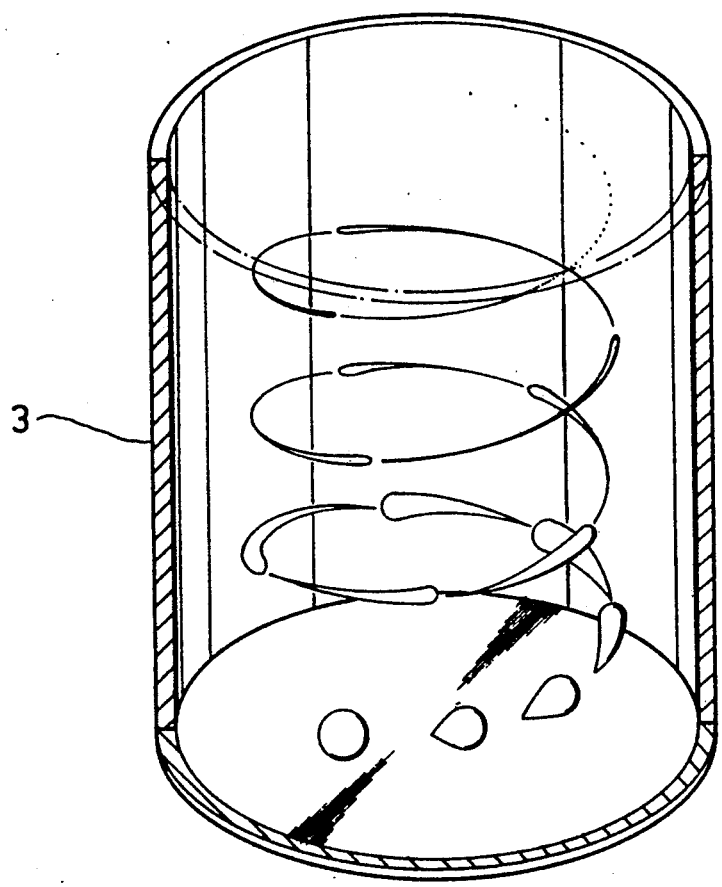
FIG. 2 is a diagram illustrating the method of purifying pollutant gases hereunder.

In this invention, a vortex is formed inside the tank by the pressure from the transfer pump of the purifying solution and it is accelerated by the purifying solution which is continuously spurted, with the gyration power caused by the vortex remaining larger than the buoyancy of the bubbles of the gas. As a result, the bubbles gradually become thinly elongated as illustrated in FIG. 2 and rotates at a high speed. Further, by the work of buoyancy it comes to rise and gyrate in a spiral form by the composition of vector.

Therefore, the bubbles which gradually become thinly elongated is absorbed by the purifying solution and disappear ultimately, while only the harmless $CO_2$ gas sufficiently purified with the purifying solution rises upward to be eliminated of water in a gas-water separator, and then the gas is vented through its vent pipe. This way it prevents air pollution and helps maintain a pleasant working environment.

Figure 3:
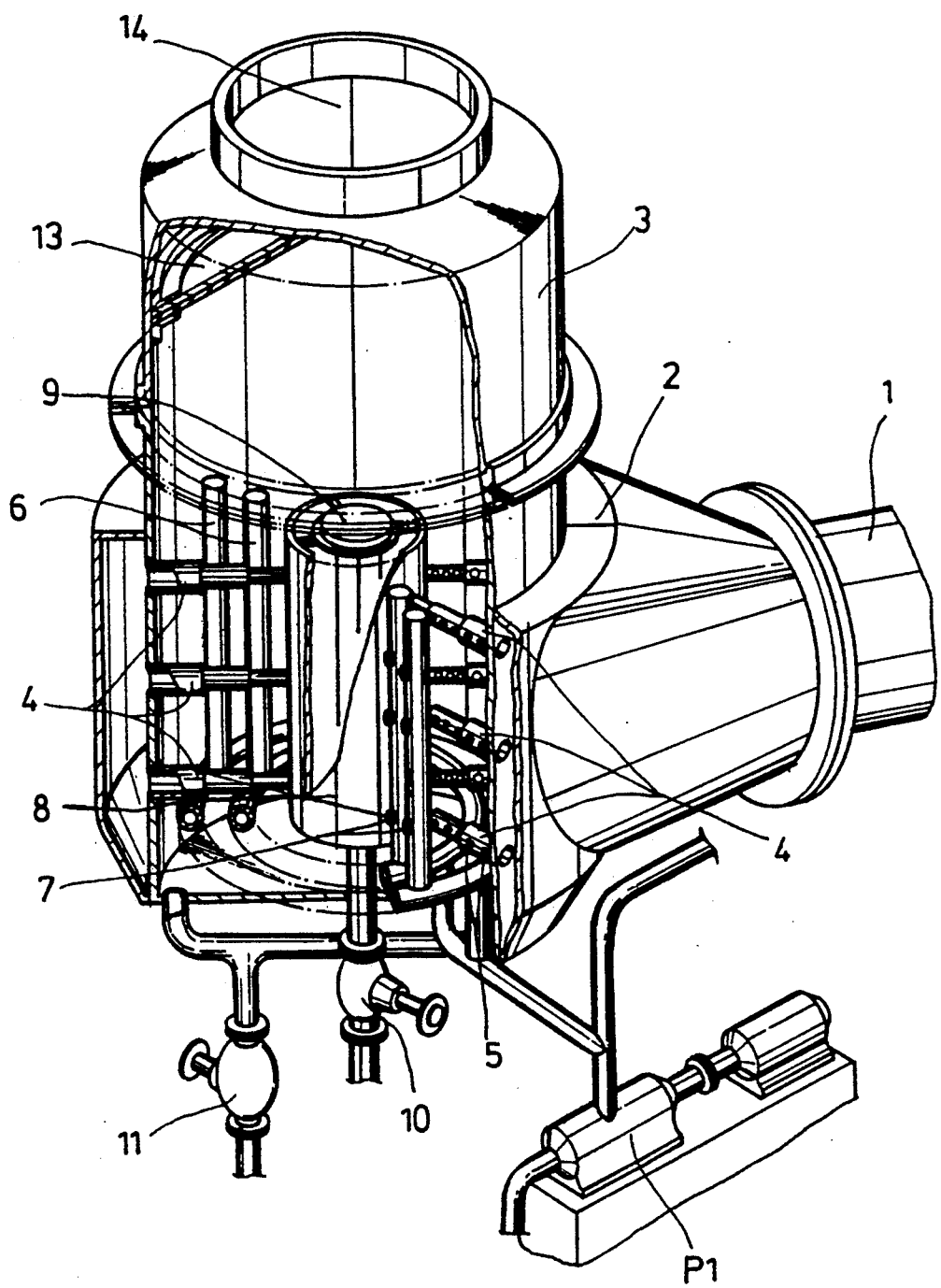
FIG. 3 is a diagram showing an example of the apparatus for the purification of pollutant gases hereunder.
Figure 4:
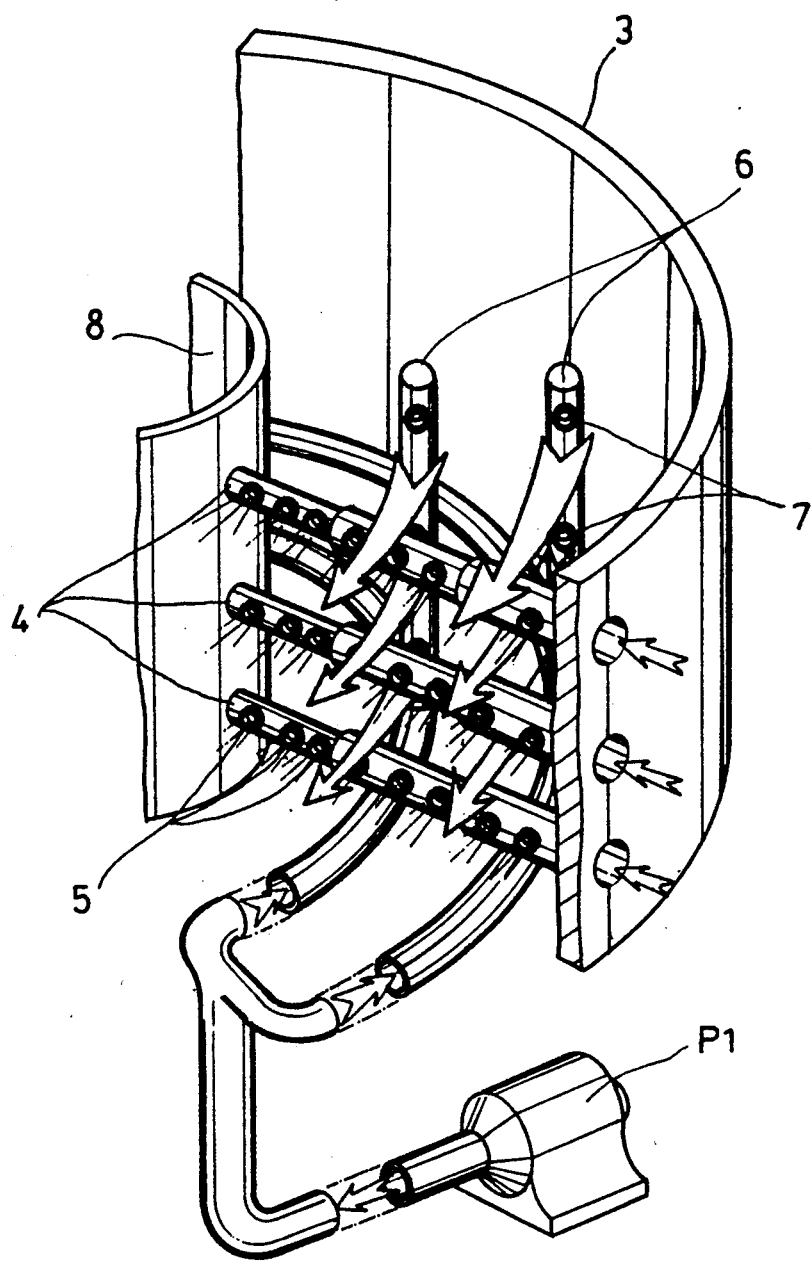
FIG. 4 is a perspective illustration of the main parts of the purifying apparatus hereunder.
Figure 5:
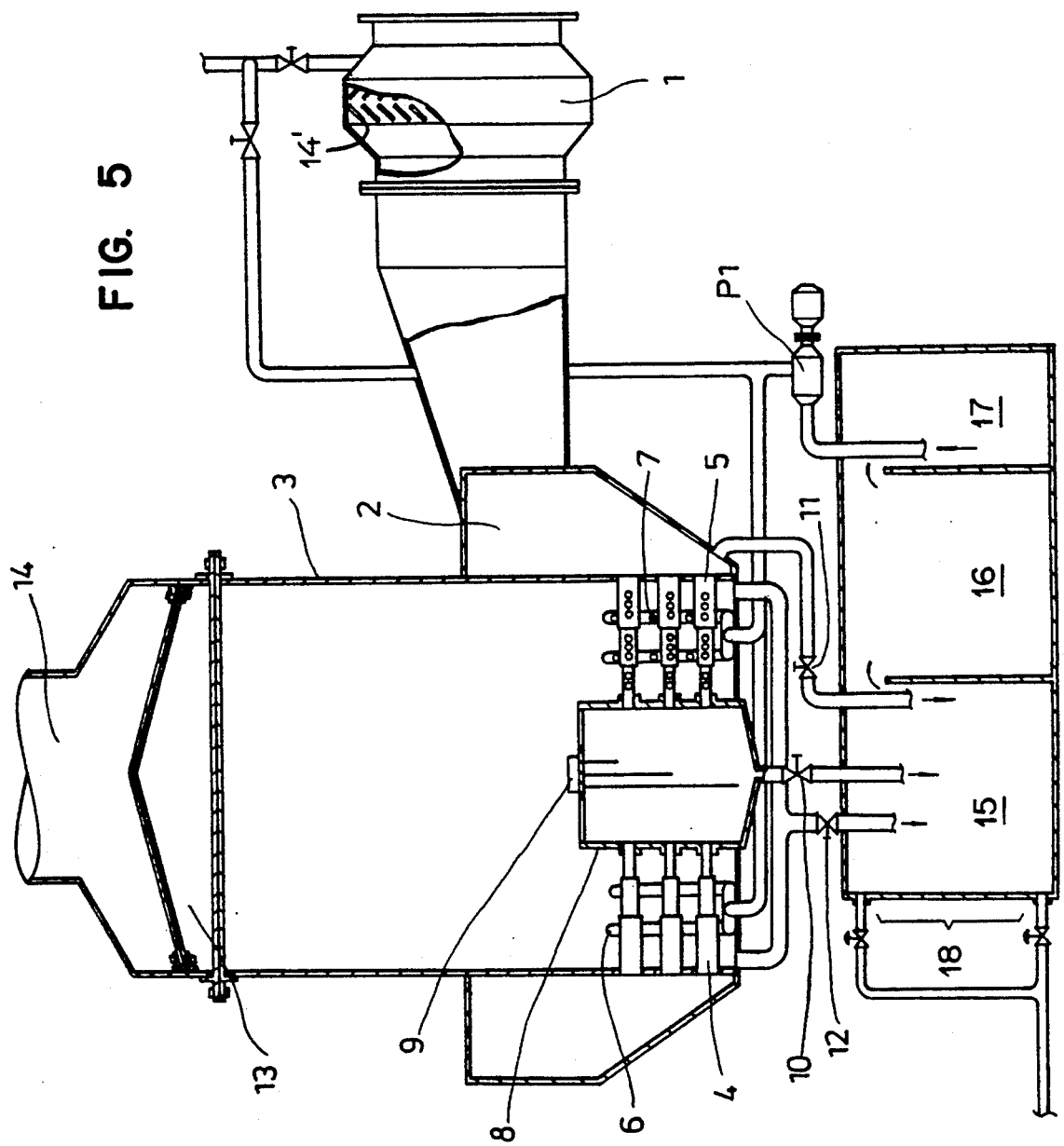
FIG. 5 is a longitudinal section showing the general state of the purifying apparatus constructed hereunder.

The concrete purifying apparatus for the embodiment of this invention is illustrated in FIG. 3. The pollutant gas occurring at the work site is passed through the known eliminator (1) with the help of a suction fan (not indicated in the figure). The annular gas feed tube (2) is connected thereto and the cylindrical water tank (3) is straightly erected along its inner circumferential surface, while a large number of nozzles (5) are formed in a fixed direction on a number of connecting tubes (4) which are radially installed inside. The above-mentioned connecting tubes (4) and annular gas feed tube (2) are interconnected and a large number of water tubes (6) are longitudinally installed and the nozzles (7) in a fixed direction are arranged vertically. Many water tubes (6) are also connected to the pump (P1), while auxiliary water tank (8) is installed at the center of the cylindrical water tank (3), with the solenoid valve (10) which is actuated by the level probe (9) connected in the lower part. The unexplained FIG. 11 is a drain valve of the annular gas feed tube (2), 12 is a drain valve of the cylindrical water tank (3), 14 is a vent pipe for the purified gas, 14' is a diaphragm with the known eliminator (1), 15 is a recovery tank, 16 is a filtration tank, 17 is a water storage tank and 18 indicates discharge valves.

In this invention, the pollutant gases sucked in from various work sites by suction fans come into contact with the purifying solution from nozzle tubes and pass through a large number of diaphragms (14'), with the purifying solution coagulated on the diaphragms. Prepurified pollutant gases are subject to separation and reach the annular feed gas tube (2), and the coagulated purifying solution accumulates in its lower part, while the pollutant gas flows into the connecting tubes (4) and it is blast off the nozzles (5). When the pump (P1) is put into operation under the situation, the purifying solution is pumped into water tubes (5) inside the cylindrical water tank (3) and the water is spurted from the nozzles (7). Since the nozzles (5) of connecting tubes (4) and those of water tubes (6) are in the same direction, the water spurted into the cylindrical water tank (3) forms a vortex on its own, while its gyration is further accelerated by the water which is continuously spurted. Under the situation, the pollutant gas is blast by the pressure of the suction fan from the nozzles (5) of connecting tubes (4) and the bubbles gyrate with the purifying solution at a high speed. The purifying solution in gyration furthers the blasting of the pollutant gas, with such pollutant gas gaining its ascending power due to the buoyancey, finally becoming thinly elongated in a spiral to be broken up and then disappear.

Accordingly, the pollitant gas blast off the nozzles (5) gyrates several times in the voluminous purifying gas and comes into contact with water for a extended period of time to be absorbed by either dissolution or reaction.

The pollutant gas and the purifying solution coming into contact with each other at the volume ratio of well over one to two, only such purified gas portions as air and $CO_2$ move upward in the cylindrical water tank (3). The purified gas is eliminated of water in the known gas-water separator (13) and then discharged through the vent pipe (14).

At the same time, since the volume of the purifying solution which is supplied by the pump (P1) into the cylindrical tank (3) increases gradually, the auxiliary tank (8) is installed in order to control its leve. The purifying solution in vortex overflows into the auxiliary tank (8). When the volume reaches the upperlimit level, it is sensed by the level probe (9) and leads to the opening of the solenoid valve (10), with the spent purifying solution collected in the recovery tank (15). The solution is removed of impurities through the filtration tank (16) and then stored in the storage tank (17).

Therefore, both the auxiliary tank (8) and cylindrical tank (3) keep a fixed level of the purifying soluttion, while the purifying solution in the storage tank (17) can be recovered by the pump (P1) for reuse.

Since the purifying solution accumulates in the annular gas feed tube (2) is feared to plug the nozzles (5) and hinder the blasting of the gas, it is necessary to open the drain valve (11) periodically for discharging. At the same time, since the cylindrical tank (3) should also be periodically vacated of the purifying solution for washing, there is installed the drain valve (12).

In the present invention, the polluted purifying solution accumulates in the recovery tank (15) in the course of operations, but it can be discharged by means of the discharge valve (18). It goes without saying that a proper amount of neutralizing agent can also be dosed, either manually or automatically, into such vessels as recovery tank (15), filtration tank (16) and storage tank (17) depending upon the kind of pollutant gas.

The purifying method and the apparatus thereof hereunder was practically applied on a trial basis to the purification of the pollutant gas being generated from a zinc plating process. When 400 liters of dust, 50 liters of $SO_X$ and 50 liters of $NH_3$ were sucked in, the purified gas discharged from the final gas vent pipe (14) contained 2 mg/$Sm^3$ of dust, while traces of $SO_X$ and $NH_3$ were determined respectively, as confirmed by the Korea Environmental Technology Institute, proving that the purifying performance was far superior to the standard figures of 200 mg/$Sm^3$ of dust, 800 ppm of $SO_X$ and 250 ppm of $NH_3$.

Thus, attaining an outstanding purifying performance, this invention can prevent the air pollution resulting from harmful gases while also preventing such industrial calamities as pneumoconiosis which is caused by pollutants. What is more, in case this invention is applied to an incinerator which is not in the state of practical use due to its inevitable discharge of heavily polluted exhaust gas, it can also be vented in the state of perfect purification, with the incinerator becoming operative. In this case, there is an effect of making it possible to utilize resources by the incineration of waste materials.

What I claim is:

1. A method of purifying a pollutant gas comprising:
   partially filling an enclosed area with a purifying solution;
   causing said purifying solution to swirl in a vortex motion;
   injecting said pollutant gas directly into the swirling purifying solution wherein said gas is injected into the solution from a number of spaced, radially oriented locations and thereby creating bubbles of pollutant gas within the purifying solution;
   maintaining the pollutant gas in contact with the purifying solution for a duration of time that allows the bubbles of gas to become elongated and to become absorbed by the liquid; and
   venting purified gas from the enclosed area.

2. The method of claim 1 wherein the enclosed area has an outer wall and the locations from which the gas is injected into the liquid are spaced from said outer wall.

3. The method of claim 1 wherein the purifying liquid is caused to rotate by radially injecting the liquid into the enclosed area thereby causing which causes any liquid already located in said enclosed area to move in a circular direction.

4. The method of claim 3 wherein the purifying liquid is injected into the enclosed area from a plurality of spaced nozzles located within said enclosed area.

5. A method of purifying a pollutant gas comprising:
   filling a portion of an enclosed area with a purifying solution;
   causing said purifying solution to swirl in a vortex motion by injecting purifying liquid into the liquid filled portion of the enclosed area in a direction that causes said liquid located in the filled portion of the enclosed area to swirl;
   injecting a pollutant gas directly into the swirling purifying solution wherein said gas is injected into the same portion of the enclosed area that is being injected with the purifying solution;
   maintaining the pollutant gas in contact with the purifying solution for a predetermined duration of time that allows said gas to at least partially become absorbed into said purifying solution; and
   venting purified gas from the enclosed area.

* * * * *